(12) United States Patent
Nakajima

(10) Patent No.: US 8,534,521 B2
(45) Date of Patent: Sep. 17, 2013

(54) ACCESSORY MOUNTING DEVICE FOR SADDLE RIDING TYPE VEHICLE

(75) Inventor: Shoichi Nakajima, Wako (JP)

(73) Assignee: Honda Motor Co., Ltd, Tokyo (JP)

(*) Notice: Subject to any disclaimer, the term of this patent is extended or adjusted under 35 U.S.C. 154(b) by 181 days.

(21) Appl. No.: 13/050,479

(22) Filed: Mar. 17, 2011

(65) Prior Publication Data

US 2011/0233249 A1   Sep. 29, 2011

(30) Foreign Application Priority Data

Mar. 29, 2010   (JP) ................. 2010-076192

(51) Int. Cl.
*B60R 11/00*   (2006.01)

(52) U.S. Cl.
USPC ........... 224/413; 224/419; 224/452; 224/545; 224/547; 224/553; 224/562; 224/929

(58) Field of Classification Search
USPC ............. 224/545, 546, 547, 548, 550, 562, 224/559, 412, 413, 419, 421, 441, 443, 445, 224/452, 482, 483, 551, 553, 929; 455/575.9; 379/454, 455; 248/181.1, 300, 176.1, 917–923
See application file for complete search history.

(56) References Cited

U.S. PATENT DOCUMENTS

| | | | | |
|---|---|---|---|---|
| 4,097,012 A | * | 6/1978 | McIntyre | 248/674 |
| 4,368,866 A | * | 1/1983 | Urban | 248/286.1 |
| 5,246,193 A | * | 9/1993 | Faidley | 248/206.3 |
| 5,556,015 A | * | 9/1996 | Vincent | 224/328 |
| 6,158,793 A | * | 12/2000 | Castro | 296/1.07 |

FOREIGN PATENT DOCUMENTS

| | | |
|---|---|---|
| JP | 2-24393 Y2 | 7/1990 |
| JP | 3608753 B2 | 1/2005 |

* cited by examiner

*Primary Examiner* — Adam Waggenspack
(74) *Attorney, Agent, or Firm* — Westerman, Hattori, Daniels & Adrian, LLP

(57) ABSTRACT

There is provided an accessory mounting device for a saddle riding type vehicle. An accessory mounting device for mounting a navigation device on a fuel tank comprises a base body on which the navigation device is mounted, and permanent magnets caused to stick to the fuel tank and thus allowing the base body to be mounted thereon. The permanent magnets are provided on the base body via spherical joints. In this sense, the permanent magnets are caused to stick to the fuel tank in a manner such that directions thereof are changed depending on a shape of the fuel tank, thus obtaining a stable mounting structure. Further, since there is no need to provide flexible members around the permanent magnets, an excellent durability is achieved. Furthermore, the base body comprises a bracket for holding the car navigation device, and an angle of the bracket can be adjusted.

22 Claims, 8 Drawing Sheets

ACCESSORY MOUNTING DEVICE FOR SADDLE RIDING TYPE VEHICLE

BACKGROUND OF THE INVENTION

1. Field of the Invention

The present invention relates to an accessory mounting device for a saddle riding type vehicle.

2. Description of Related Art

Conventionally, as a mounting device of this type, there has been known an electric component mounting device for two-wheeled vehicle composed of a fixation portion mounted on a tank or a handlebar of a two-wheeled vehicle, and a holder for holding an electric component. The fixation portion is provided on a vehicle body center line extending in a front-rear direction of the two-wheeled vehicle. The holder is so attached to the fixation portion that it can rotate about an axis of a left-right direction. There are also provided an upper receiving hardware and a lower receiving hardware that are screwed together via bolts, and are thus allowed to hold the handlebar therebetween and be fixed thereto. The fixation portion is fixed by means of the aforementioned bolts (e.g., see Japanese Patent No. 3608753).

With regard to such electric component mounting device for two-wheeled vehicle, an extra mounting structure is required to mount the fixation portion on the tank. Further, since only one center of rotation is provided on a back surface side of the electric component, the electric component is allowed to face a driver at only one position. Practically, there also have to be taken into consideration entering of external lights, and prevention of interference with meters and gauges of the vehicle, when adjusting a position as well as an angle of the electric component.

Further, as a mounting structure mounted on a tank, there has been known a tank bag comprising holders attached to four corners thereof. Such holders are allowed to be freely rotated in a horizontal direction, and are respectively provided with a permanent magnet (e.g., see Japanese Examined Utility Model (Registration) Application Publication No. Hei 2-24393). Such tank bag is fixed to a tank of a motorcycle by unfolding the holders and allowing the same to stick to the tank.

SUMMARY OF THE INVENTION

With regard to the aforementioned tank bag, an accessory is allowed be mounted on a tank of a two-wheeled vehicle when disposed inside the tank bag. However, when a filler cap is provided in the center of the fuel tank, a mounting location and a mounting structure of the tank bag are easily subjected to restrictions. For example, when the tank bag is so mounted on the tank that it blocks the filler cap, the tank bag has to be removed every time fuel filling is performed.

Further, with regard to the aforementioned tank bag, since a flexible material is employed as the holder, the tank bag can be mounted on a tank having a curved surface shape. However, since a thick fabric, a resin or the like is particularly employed as the holder, the tank bag is inferior in U.V. toughness and oil resistance, thus giving rise to a problem of durability.

Particularly, an accessory will move around due to a vibration of a vehicle body or the like, when mounted on the tank by means of the flexible holders and thus not firmly fixed. In this sense, the tank bag can not be used to mount an accessory used through visual contact.

Here, in view of the aforementioned problems, it is an object of the present invention to provide an accessory mounting device for a saddle riding type vehicle, capable of firmly mounting an accessory on vehicle bodies of various shapes.

In order to achieve the aforementioned objectives, the invention according to a first aspect is an accessory mounting device for a saddle riding type vehicle, for mounting an accessory on a vehicle body of a saddle riding type vehicle. Such accessory mounting device for a saddle riding type vehicle comprises a base body on which the accessory is mounted, and mounting members for mounting the base body on the vehicle body, such mounting members being provided on the base body via spherical joints.

Further, according to the invention described in a second aspect, the mounting members are caused to stick to the vehicle body.

Furthermore, according to the invention described in a third aspect, the base body comprises a front leg portion and a rear leg portion equipped with the mounting members, respectively, and an angle between the front leg portion and the rear leg portion can be adjusted.

Furthermore, according to the invention described in a fourth aspect, the base body comprises a holder for holding the accessory, and angles of the front leg portion, the rear leg portion and the holder can be adjusted by means of common axes.

Furthermore, according to the invention described in a fifth aspect, long holes allowing the axes to be inserted therethrough are provided on any two of the front leg portion, the rear leg portion and the holder.

Furthermore, according to the invention described in a sixth aspect, there is provided an auxiliary strip for connecting the base body to the vehicle body.

According to the accessory mounting device for a saddle riding type vehicle of the first aspect of the present invention, directions of the mounting members are changed depending on a shape of a vehicle body on which the mounting device is mounted, thereby achieving a stable mounting structure. Further, since no flexible member is provided around the mounting members, the mounting structure realizes firm fixation and has an excellent durability.

Further, according to the accessory mounting device for a saddle riding type vehicle of the second aspect of the present invention, the base body is mounted on the vehicle body by allowing the mounting members to stick to the vehicle body.

Furthermore, according to the accessory mounting device for a saddle riding type vehicle of the third aspect of the present invention, the mounting members can be mounted with respect to an angle between a front portion and a rear portion of the vehicle body on which the mounting device is mounted.

Furthermore, according to the accessory mounting device for a saddle riding type vehicle of the fourth aspect of the present invention, the angle between the front leg portion and the rear leg portion can be adjusted. In this sense, a versatility of the mounting device is improved, and the mounting device can be mounted on vehicle bodies of various shapes. In addition, a direction of the accessory can be adjusted by adjusting the angle of the holder. Since the common axes are employed, the mounting device has a simple structure.

Furthermore, according to the accessory mounting device for a saddle riding type vehicle of the fifth aspect of the present invention, the axes are allowed to move along the long holes, thus making it possible to adjust the angles of the front leg portion, the rear leg portion and the holder.

Furthermore, according to the accessory mounting device for a saddle riding type vehicle of the sixth aspect of the present invention, the base body is allowed to be connected to the vehicle body by means of the auxiliary strip.

DETAILED DESCRIPTION OF THE INVENTION

Figure 1:
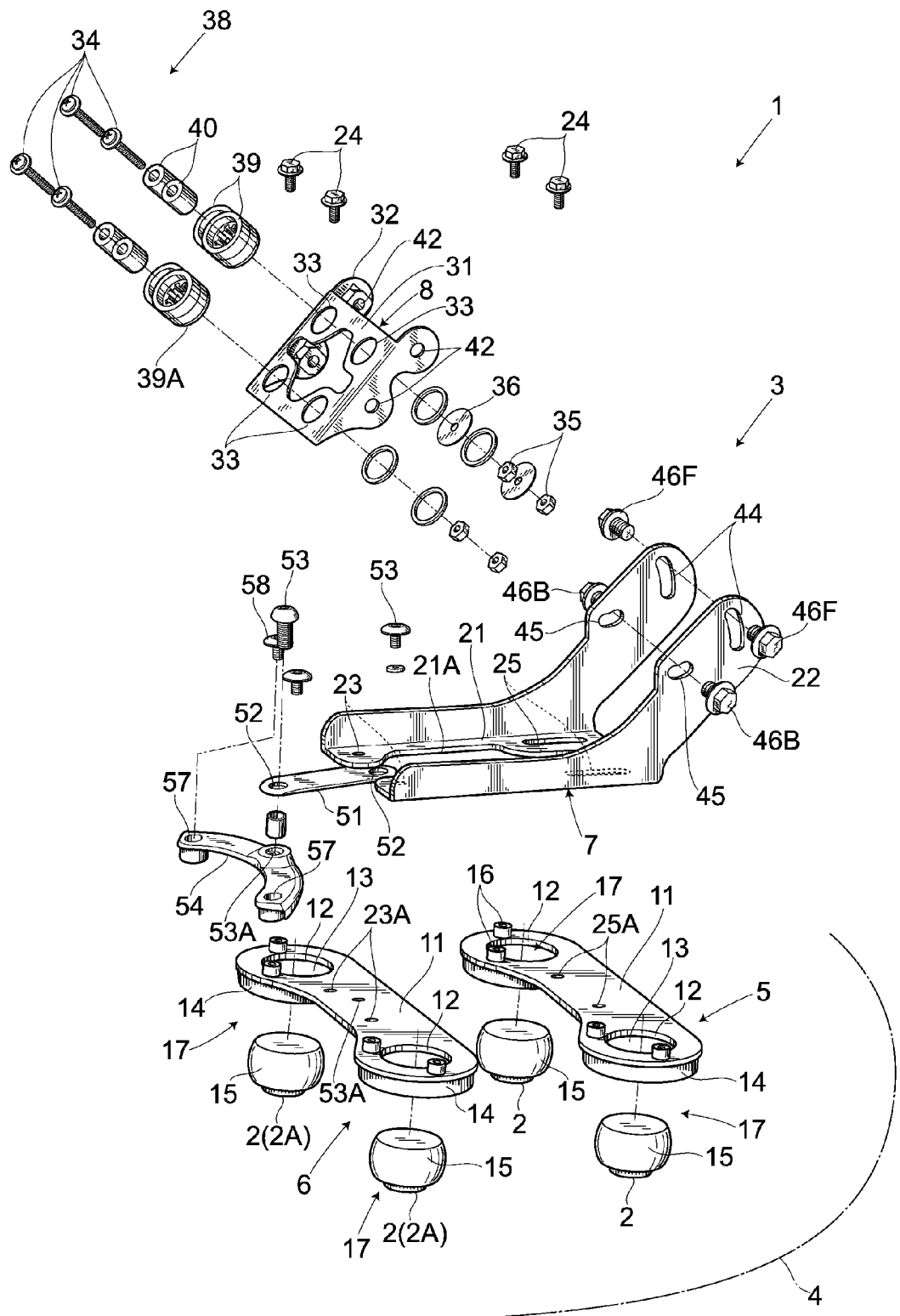
FIG. 1 is an exploded perspective view showing a first embodiment of the present invention.

A first embodiment of the present invention is described hereunder with reference to the accompanying drawings.
(First Embodiment)

As shown in FIG. 1 through FIG. 6, an accessory mounting device 1 comprises a base body 3 detachably mounted on a vehicle body via permanent magnets 2, such vehicle body being located between a seat and a handlebar of a saddle riding type vehicle that is a motorcycle. In FIG. 1 through FIG. 6, there is shown an example in which the base body 3 is mounted on a fuel tank 4 serving as a vehicle body. According to the present embodiment, there are used as mounting members the permanent magnets 2 exhibiting sticking effects due to magnetic forces thereof. However, there can also be used as mounting members electromagnets, suction disks, planar fasteners, bonding layers or the like.

The base body 3 comprises a front leg portion 5 and a rear leg portion 6 that are made of metal. The front leg portion 5 and the rear leg portion 6 are coupled together by means of a receiving member 7 made of metal. A metallic bracket 8 serving as a holder is mounted on such receiving member 7 in a manner such that a position and an angle thereof can be adjusted. Further, a navigation device 9 that is an accessory is mounted on such bracket 8. In this sense, the base body 3 of the present embodiment is composed of the front leg portion 5, the rear leg portion 6, the receiving member 7 and the bracket 8. Here, cost reduction can be expected, if the bracket 8 is made of steel. And, weight reduction can be expected, if the front leg portion 5, the rear leg portion 6 and the receiving member 7 are made of aluminum. In addition, further weight reduction can be expected, if the bracket 8, the front leg portion 5, the rear leg portion 6 and the receiving member 7 are made of a carbon member. In this sense, materials used can be appropriately selected.

The aforementioned navigation device 9 comprises: a navigation display 9A displaying navigation information including destinations, current locations of the vehicle or the like; a controller for controlling the navigation display 9A; and an operation portion used to perform an input operation with respect to the controller.

The front leg portion 5 and the rear leg portion 6 share a same structure. Particularly, both the front leg portion 5 and the rear leg portion 6 comprise a leg portion main body 11 having a flat plate shape and extending in a left-right direction. On the left side and the right side of the leg portion main body 11, there are respectively bored through holes 12, 12 and formed holders 14 having through holes 13 communicated with the through holes 12, 12. Further, a spherical receiving section 13A serving as a part of a spherical surface is formed on a lower portion of the through hole 13, and the through hole 13 has a smallest diameter at a lower end thereof. Furthermore, a swing body 15 made of synthetic resin has a spherical outer circumferential surface 15A corresponding to the spherical receiving section 13A. The aforementioned permanent magnet 2 is integrally provided on a lower portion of the swing body 15 via insert molding, and an undersurface 2A of the permanent magnet 2 is caused to stick to the vehicle body. Here, polyacetal (product name: DURACON) or the like, for example, can be used as a synthetic resin of which the swing body 15 is made of.

Next, the swing bodies 15 are fitted into the through holes 13, beginning with upper portions thereof. With such swing bodies 15 fitted into the through holes 13, the holders 14 are then fixed to undersurfaces of the leg portion main bodies 11 by means of screws 16 serving as fixation members. At that time, the trough holes 12 serve to prevent the swing bodies 15 from being disengaged upwardly. In this way, the swing bodies 15 are attached to the leg portions 5, 6, and there is formed a spherical joint 17 composed of the through holes 12, 13 and the swing body 15. Due to such spherical joints 17, the permanent magnets 2 are swingably provided on the leg portions 5, 6, and are swingable for 360 degrees. Here, the through hole 12 may be formed into a shape serving as a part of a spherical surface corresponding to the aforementioned outer circumferential surface 15A.

The aforementioned receiving member 7 integrally comprises a bottom plate 21 having a substantial "U" shape when viewed from the top, and side plates 22, 22 provided on both a left side and a right side of a front side of the receiving member 7. Such bottom plate 21 has an opening 21A on a rear side thereof. Further, through holes 23, 23 are bored on a left side and a right side of the rear side of the bottom plate 21, and screws 24 serving as fixation members are inserted through such through holes 23, 23. The screws 24 are then screwed together with female screw holes 23A of the rear leg portion 6, thereby allowing the rear leg portion 6 to be fixed to the bottom plate 21. At that time, the spherical joints 17 are respectively positioned on an outer left side and an outer right side of the bottom plate 21. Further, long holes 25, 25 extending in a front-rear direction are respectively bored on a left side and a right side of a front side of the bottom plate 21. The screws 24 are inserted through such long holes 25, and then screwed together with female screw holes 25A of the front leg portion 5, thereby allowing the front leg portion 5 to be fixed to the bottom plate 21 in such a way that a position thereof can be adjusted in the front-rear direction. The long holes 25 and the screws 24 compose a distance adjustment unit 26 of the front leg portion 5 and the rear leg portion 6.

The aforementioned bracket 8 is described hereunder. The bracket 8 integrally comprises an mounting portion 31 on which the navigation device 9 is mounted and side plates 32, 32 respectively provided on a left side and a right side of the mounting portion 31. Particularly, a lower portion of the bracket 8 is opened and formed into an inverted "U" shape. The side plates 32, 32 are inserted between the side plates 22, 22 of the receiving member 7.

A plurality of mounting holes 33, 33, 33, 33 (three or more, four in this embodiment) are bored on the mounting portion 31. Elastic cylindrical bodies 39 are fixed to such mounting holes 33 by means of a mounting member 38 comprising a bolt 34, a nut 35, a washer 36 and a collar 37. Further, a hard inner cylindrical body 40 is attached inside such elastic cylindrical body 39, and an attachment 41 of the navigation device 9 abuts against the elastic cylindrical bodies 39 from above and is fixed thereto. Furthermore, engagement grooves 39A are provided on rear portions of the elastic cylindrical bodies 39. Such engagement grooves 39A are to be engaged with the mounting holes 33.

The navigation device 9 can be attached to the attachment 41 through insertion, and can actually be removed therefrom by operating the operation portion not shown.

Further, the side plates 32, 32 of the bracket 8 are provided with female screw holes 42, 42 that are distant from each other in the front-rear direction. Particularly, such female screw hole 42 is composed of a nut 43 fixed on an inner surface of the side plate 32. Long holes 44, 45 corresponding to the female screw holes 42, 42 are respectively formed on a front side and a rear side of the side plate 22 of the receiving member 7, such long holes serving as guiding paths. A front screw 46F serving as a front moving portion is inserted through the front long hole 44, and is then screwed together with the corresponding female screw hole 42. Similarly, a rear screw 46B serving as a rear moving portion is inserted through the rear long hole 45, and is then screwed together with the corresponding female screw hole 42. In this way, the screws 46F, 46B serving as axes in transverse directions are allowed to move along the long holes 44, 45, respectively. According to the present embodiment, the front long hole 44 is formed longer than the rear long hole 45.

In addition, the long holes 44, 45 serving as guiding paths, the front screw 46F and the rear screw 46B compose an angle setting unit 47 allowing the angle of the bracket 8 to be adjusted via a front-rear motion.

Figure 4:
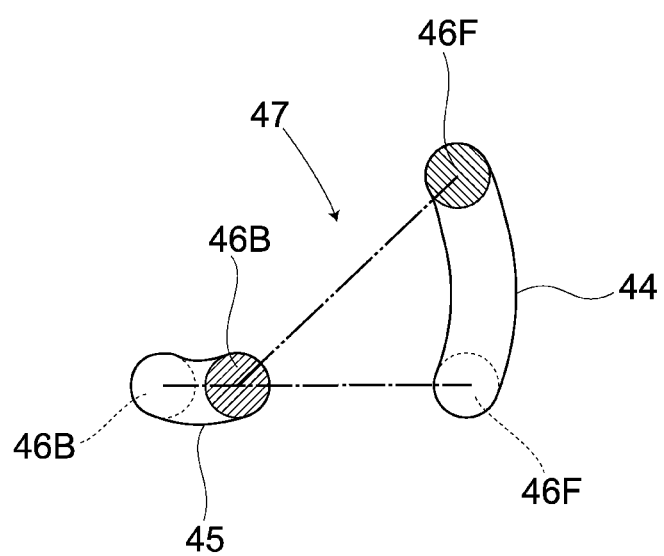
FIG. 4 is an explanatory diagram showing an angle setting unit of the first embodiment of the present invention.

According to the present embodiment, the front long hole 44 is formed long in a substantially vertical direction, while the rear long hole 45 is formed long in a substantial front-rear direction. Both the long holes 44, 45 are formed into curved shapes. The front screw 46F is caused to move along the front long hole 44, while the rear screw 46B is caused to move along the rear long hole 45. As shown in FIG. 4, starting from a state in which the front screw 46F is located at an upper end of the front long hole 44, and the rear screw 46B is located at a front end of the rear long hole 45, the front screw 46F is caused to move downwardly along the front long hole 44 as the rear screw 46B moves to the rear side along the rear long hole 45. At that time, the navigation device 9 is rotated in such a way that an upper portion of the display 9A thereof comes down. Conversely, an upper portion of the navigation device 9 is caused to rotate toward the rear side as the lower portion of the bracket 8 is moved toward the front side, thus allowing the navigation device 9 to rise up.

The present embodiment is different from the conventional art in which only one center of rotation is provided on a back surface side of an electric component. Specifically, the front screw 46F and the rear screw 46B are caused to move along the long holes 44, 45, respectively, and the bracket 8 serving as a holder is thus allowed to move within a predetermined range of angle. In this sense, the navigation device 9 that is an electric component will face a user, even when the bracket 8 is moved in the front-rear direction or a vertical direction, thus allowing the navigation device 9 to be adjusted to a position as well as an angle suitable for a condition of use.

Figure 5:
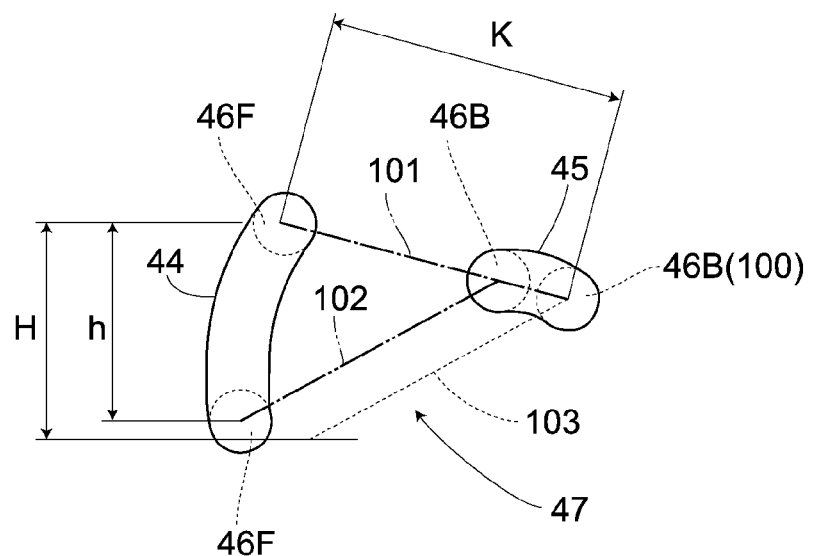
FIG. 5 is an explanatory diagram illustrating a function of the angle setting unit of the first embodiment of the present invention.
Figure 6:
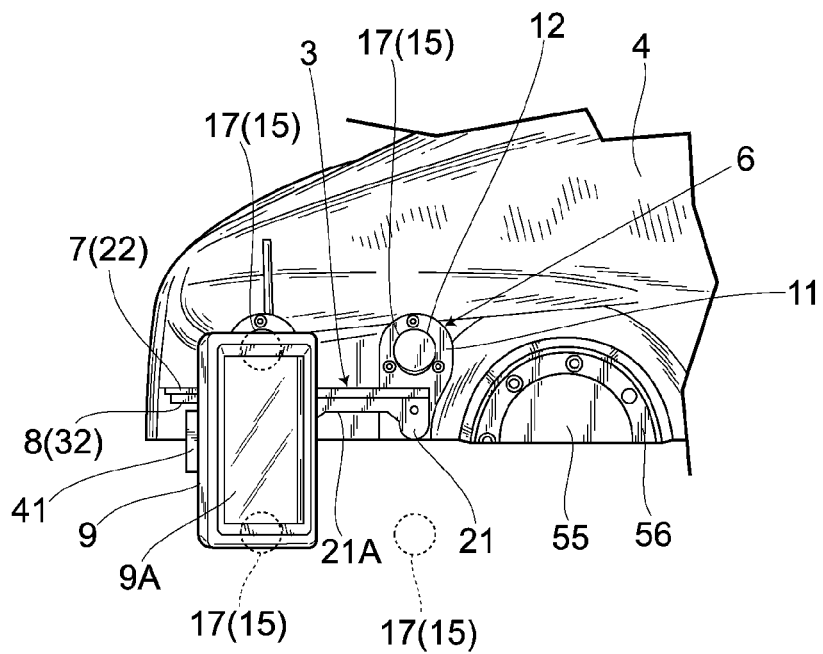
FIG. 6 is a plan view showing the essential section of the first embodiment of the present invention.

With reference to FIG. 5, there is described hereunder a difference between the present embodiment employing a two-axes sliding structure featuring the screws 46F, 46B, and the conventional art in which rotation takes place about only one axis. In FIG. 5, there is shown an pre-rotation imaginary line 101 connecting a center of the rear screw 46B located at a rear end of the rear long hole 45 and a center of the front screw 46F located at a lower end of the front long hole 44, such imaginary line 101 corresponding to the angle of the navigation device 9. Here, the length of the imaginary line 101 is identical to a distance K between the screws 46F, 46B. Further, the position of the rear screw 46B located at the rear end of the rear long hole 45 is considered as a position of a central axis 100 of the conventional art in which rotation takes place about only one axis. In this sense, the present embodiment and the conventional art share the same imaginary line 101. In addition, there is shown a post-rotation imaginary line 102 connecting the front screw 46F that has been moved to the upper end of the front long hole 44 and the rear screw 46B that has been moved to the front end of the rear long hole 45. An angle between the imaginary line 101 and the post-rotation imaginary line 102 is namely a rotation angle of the navigation device 9. Accordingly, there is also shown a post-rotation imaginary line 103 obtained by rotating a line about the central axis 100 by the aforementioned rotation angle of the navigation device 9. As shown by the imaginary lines 102, 103, a height H is required when rotation takes place about the central axis 100 whose position is fixed, while a height h is required when the two-axes sliding structure is employed. In this sense, a height required for rotation by the same angle can be reduced by employing the two-axes sliding structure. Here, in order to explain the function described so far, directions of the long holes 44, 45 are modified in FIG. 5 without modifying relative positions thereof.

Further, there is provided an auxiliary strip 51 for connecting the base body 3 and the fuel tank 4. The auxiliary strip 51 is made of a flexible band and comprises a plurality of regulation holes 52 bored in a longitudinal direction thereof. A screw 53 inserted through such regulation hole 52 and serving as a connection member is screwed together with a female screw hole 53A of the rear leg portion 6, thus allowing the auxiliary strip 51 to be connected to the base body 3. Furthermore, there is formed a metallic connection instrument 54 having a shape of an arc, such connection instrument 54 having the female screw hole 53A provided in the center thereof. The screw 53 is inserted through the regulation hole 52 located on a rear end of the auxiliary strip 51, and then screwed together with the female screw hole 53A of the connection instrument 54, thereby allowing the connection instrument 54 to be fixed to a rear side of the auxiliary strip 51. The connection instrument 54 is further connected to a circular edge portion 56 of a filler cap 55 of the fuel tank 4. The connection instrument 54 comprises through holes 57, 57 bored on both ends thereof. Screws 58 serving as connection members are inserted through such through holes 57, 57, and then screwed together with the edge portion 56, thus allowing the connection instrument 54 to be fixed to the edge portion 56. In this way, the base body 3 and the fuel tank 4 are mechanically connected to one another.

Figure 2:
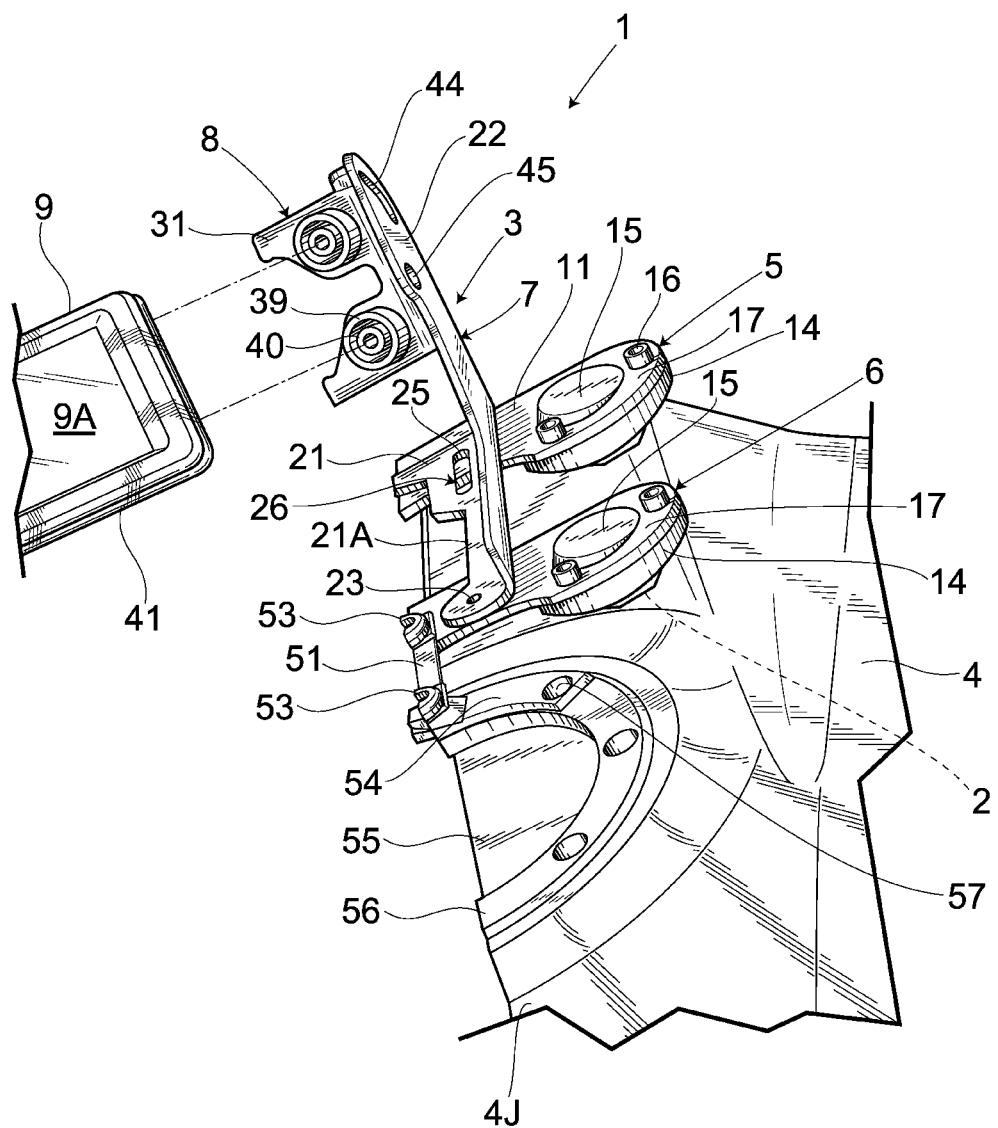
FIG. 2 is a perspective view showing an essential section of the first embodiment of the present invention.
Figure 3:
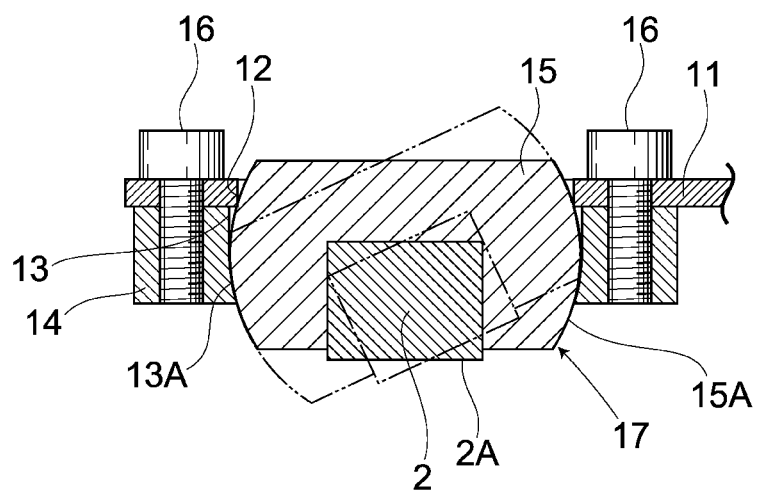
FIG. 3 is a cross sectional view of a spherical joint of the first embodiment of the present invention.

Next, as shown in FIG. 2 and FIG. 3, the under surfaces 2A of the permanent magnets 2 of the swing bodies 15 are caused to stick to the fuel tank 4 made of a magnetic material, thereby allowing the navigation device 9 to be mounted on a desired location on the fuel tank 4. Particularly, the permanent magnets 2 held by the spherical joints 17 are caused to stick to the fuel tank 4 having a curved outer surface by having directions thereof changed accordingly, thus achieving a stable mounting state and allowing the navigation device 9 to be mounted without interfering with the filler cap 55.

Further, the accessory can be mounted on the fuel tank 4 by means of the base body 3 not composed of flexible fabrics and resin, but mainly composed of metal or the like, thus obtaining a mounting structure 1 with an excellent durability.

In this way, with respect to a first aspect, the present embodiment is the accessory mounting device for the saddle riding type vehicle, for mounting the navigation device 9 that is an accessory on the fuel tank 4 that is a vehicle body in front of the seat of the saddle riding type vehicle. Such accessory mounting device comprises the base body 3 on which the navigation device 9 is mounted, and the permanent magnets 2 serving as mounting members for mounting the base body 3 on the fuel tank 4. The permanent magnets 2 are swingably attached to the base body 3 by means of the spherical joints 17. In this sense, the permanent magnets 2 are caused to stick to the fuel tank 4 by having the directions thereof changed depending on the shape of the fuel tank 4, thus obtaining a stable mounting structure 1. Further, since no flexible member is provided around such permanent magnet 2, the mounting structure realizes firm fixation and has an excellent durability.

Furthermore, according to the present embodiment and with respect to a second aspect, there are employed as mounting members the permanent magnets 2 serving as sticking members stuck to the vehicle body. Therefore, the base body 3 can be mounted on the fuel tank 4 by allowing the permanent magnets 2 to stick to the fuel tank 4.

Furthermore, according to the present embodiment and with respect to a sixth aspect, there is provided the auxiliary strip 51 for connecting the base body 3 to the fuel tank 4 serving as a vehicle body. Thus, the base body 3 is allowed to be connected to the fuel tank 4 by means of such auxiliary strip 51. Here, the auxiliary strip 51 may be connected to a vehicle body other than the fuel tank 4 on which the accessory is mounted.

As an effect of the present embodiment, since there are provided a plurality of (three or more) the permanent magnets 2 serving as sticking members, the stable mounting structure 1 is obtained. Further, since there is provided the distance adjustment unit 26 for adjusting the distance between the front leg portion 5 and the rear leg portion 6, the mounting device can be mounted on fuel tanks 4 of various shapes, thus improving the versatility thereof.

Furthermore, the mounting device comprises: the base body 3 mounted on the fuel tank 4 that is a vehicle body; the bracket 8 serving as a holder for holding the navigation device 9; and the angle setting unit 47 allowing the lower portion of the bracket 8 (which is at least part of the bracket 8) to move in the front-rear direction of the vehicle with respect to the receiving member 7, and thus allowing the bracket 8 to move within the predetermined range of angle. In this sense, the angle of the bracket 8 can be adjusted by allowing the same to move in the front-rear direction, thus making it possible to adjust the navigation device 9 to a position where it is easily visible and does not interfere with other members.

Furthermore, the angle setting unit 47 allows an upper portion of the bracket 8 serving as a holder to rotate toward the rear side of the vehicle as the bracket 8 moves from the rear side to the front side, thereby causing the navigation device 9 to rotate toward the rear side and making it possible to adjust the position as well as the angle thereof.

Furthermore, the angle setting unit 47 comprises long holes 44, 45 serving as pairs of guiding paths and provided on the base body 3 which is one of the base body 3 and the bracket 8 serving as a holder. The angle setting unit 47 also comprises pairs of screws 46F, 46B screwed together with the bracket 8 and serving as moving portions moving along the pairs of the long holes 44, 45, such bracket 8 being one of the base body 3 and the bracket 8. In this sense, the moving portions are engaged with the guiding paths, thus allowing the angle of the bracket 8 to be adjusted.

Furthermore, the long holes 44, 45 serve as guiding paths, and the screws 46F, 46B serve as moving portions moving along the long holes 44, 45, thereby allowing the angle of the bracket 8 to be adjusted by means of a simple mechanism comprising the long holes 44, 45 and the screws 46F, 46B that are engaged with one another, respectively.

Furthermore, the pairs of the long holes 44, 45 serving as guiding paths are provided in such a way that the long hole 44 is formed in a direction intersecting the long hole 45, thus allowing the bracket 8 serving as a holder to be moved and the angle thereof to be adjusted.

(Second Embodiment)

Figure 7:
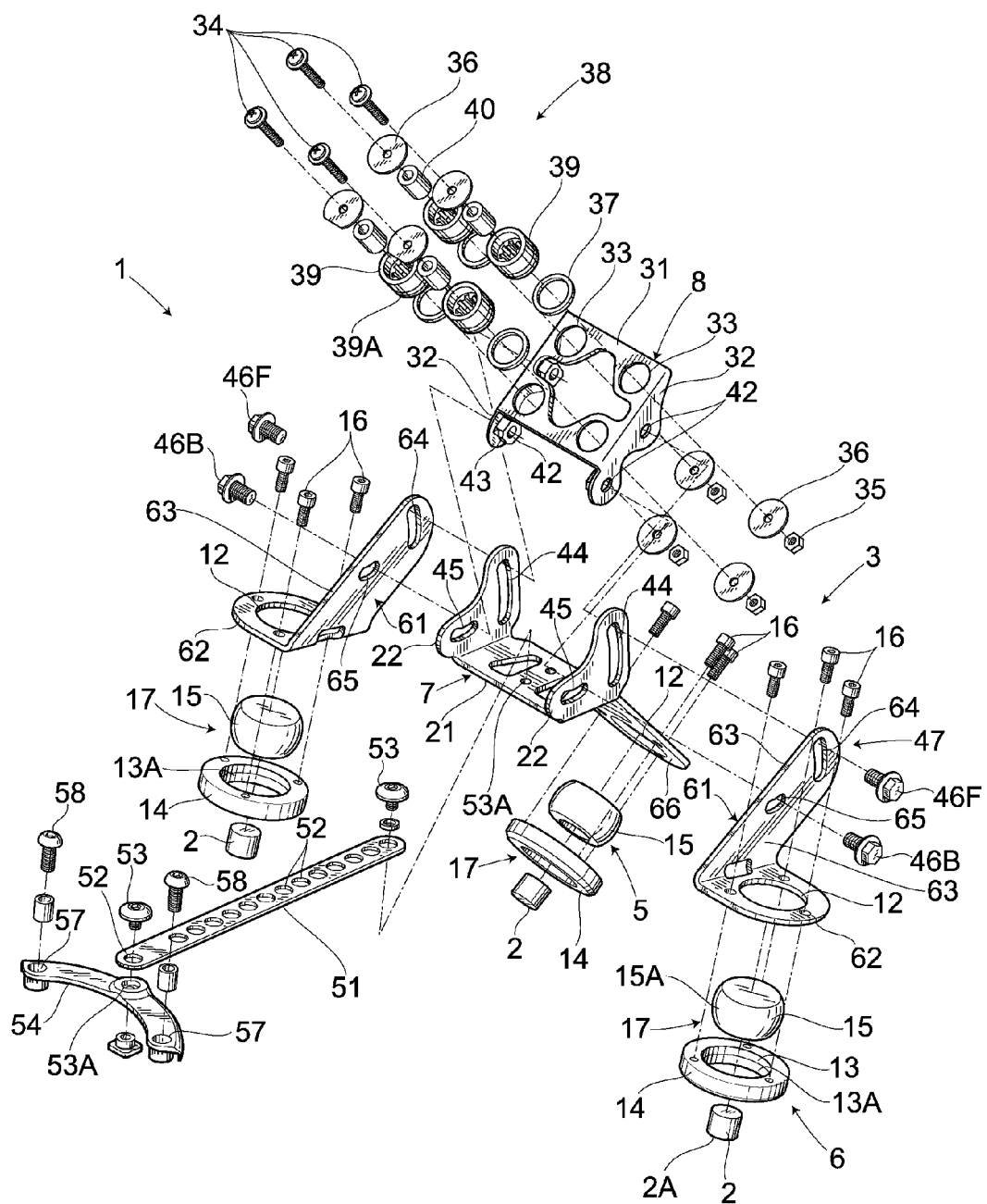
FIG. 7 is an exploded perspective view showing a second embodiment of the present invention.
Figure 8:
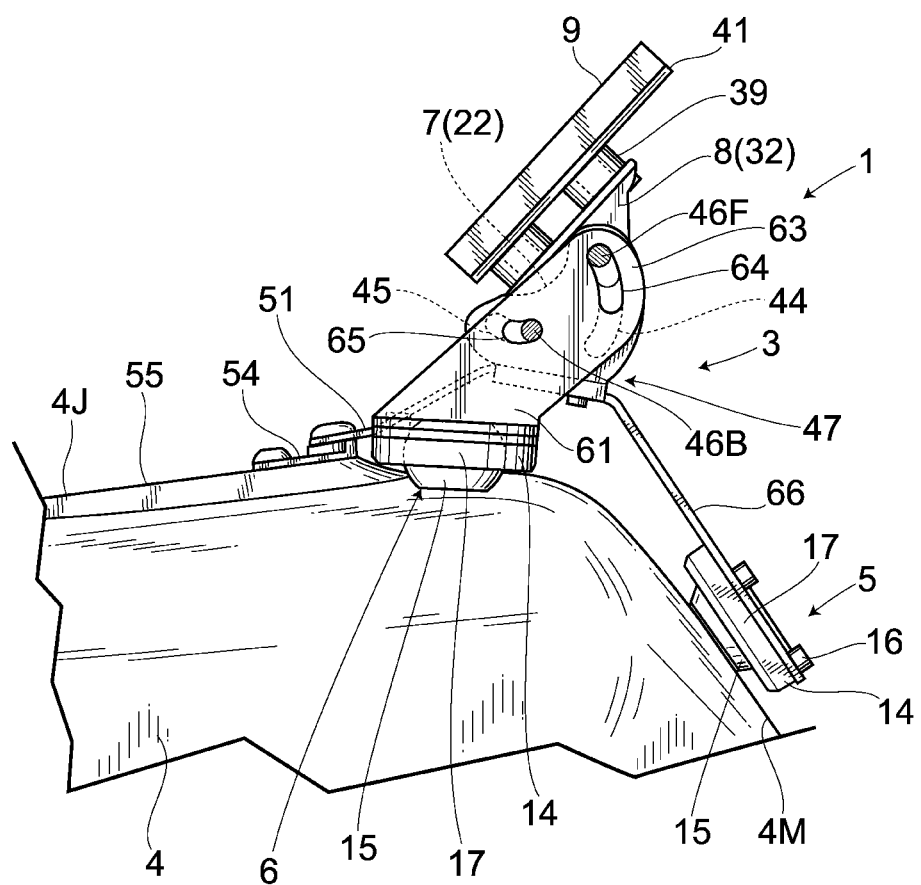
FIG. 8 is a partially cross sectional side view of the second embodiment of the present invention.
Figure 9:
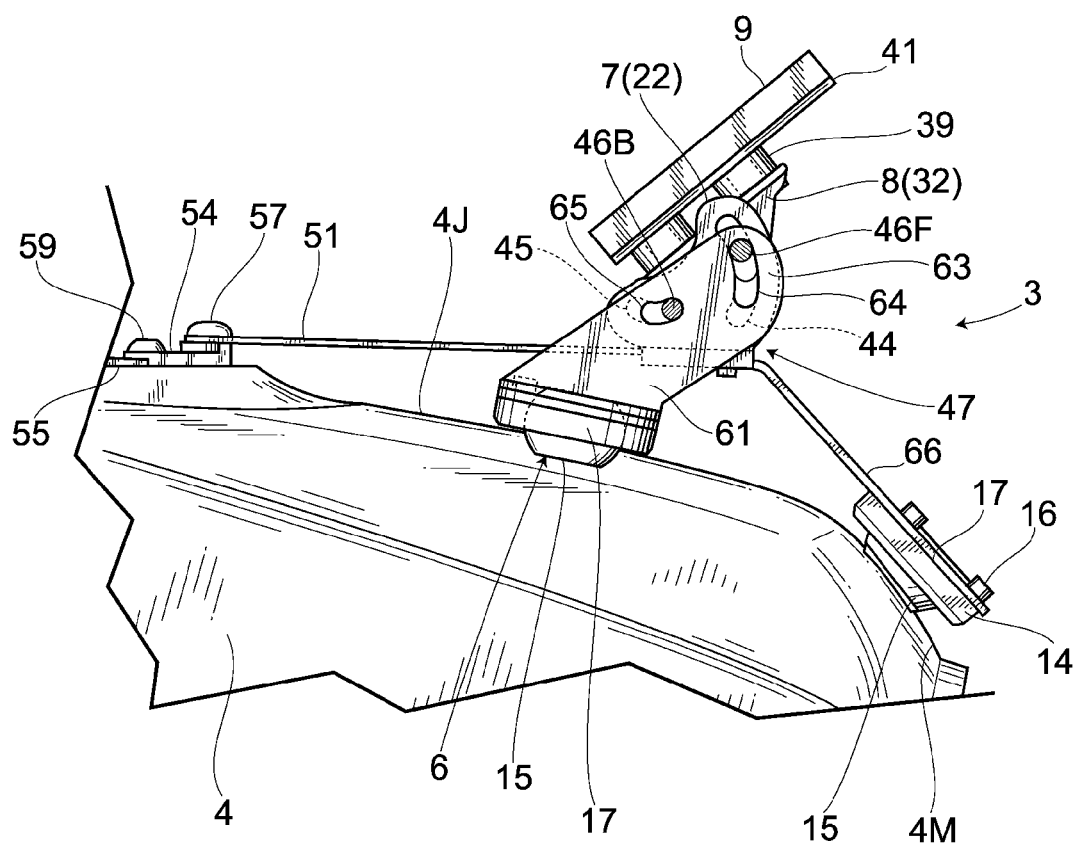
FIG. 9 is a partially cross sectional side view of the second embodiment of the present invention, in which a mounting position is modified.

A second embodiment of the present invention is shown in FIG. 7 through FIG. 9. Same reference numbers are used to describe the same parts as those in the first embodiment, thereby omitting the detailed descriptions of such parts when describing the second embodiment. With regard to a receiving member 7 of a base body 3 of the present embodiment, a bottom plate 21 is formed shorter in a front-rear direction as compared to that of the first embodiment, and slide plates 22 are formed lower as compared to those of the first embodiment. In this sense, the receiving member 7 is formed into a shape that can be easily rotated. Further, there is provided a rear leg portion 6 composed of a left and a right leg portion main bodies 61, 61, individually. Such leg portion main body 61 is formed into a substantial "L" shape and integrally comprises a bottom plate 62 to which a permanent magnet 2 is attached by means of a spherical joint 17 and a side plate 63 provided on an inner side of the bottom plate 62 in a left-right direction. In addition, a through hole 12 is bored on the bottom plate 62. Furthermore, the side plate 63 of the leg portion main body 61 comprises through holes 64, 65 formed in the front-rear direction and serving as guiding paths, such through holes 64, 65 corresponding to long holes 44, 45 of the receiving member 7. Here, in FIG. 7, there are shown long holes 44, 45, 64, 65 that are linear, and in FIG. 8 and FIG. 9, there are shown long holes 44, 45, 64, 65 that are curved. The long holes 44, 45 are formed longer than long holes 64, 65.

Next, the side plates 63 of the leg portion main bodies 61 are respectively and outwardly arranged beside the side plates 22 of the receiving member 7 in the left-right direction. Front screws 46F are inserted through the long holes 64, 44 from the outside, and then screwed together with corresponding female screw holes 42 of a bracket 8. Similarly, rear screws 46B are inserted through the long holes 65, 45, and then screwed together with the corresponding female screw holes 42 of the bracket 8. In this way, the screws 46F, 46B serving as axes are allowed to move along the long holes 64, 44, 65, 45, thus allowing the left and the right leg portion main bodies 61, 61 to swing about screws 46F, 46B serving as common axes and with respect to the receiving member 7.

Further, a front leg portion 5 integrally has the receiving member 7. The front leg portion 5 comprises an attachment plate 66 integrally disposed on a front side of the bottom plate 21 of the receiving member 7, such attachment plate 66 protruding obliquely downward with respect to the bottom plate 21. The permanent magnet 2 is provided on the attachment plate 66 by means of the spherical joint 17, and the through hole 12 is bored on a front end side of the attachment plate 66. In the first embodiment, the swing bodies 15 provided on the front leg portion 5 and the rear leg portion 6 are arranged on a same plane. However, in the second embodiment, swing bodies 15 provided on the front leg portion 5 and the rear leg portion 6 are arranged at angles with one other.

In this sense, an angle setting unit 47 of the present embodiment comprises long holes 44, 45, 64, 65 serving as guiding paths, the front screws 46F and the rear screws 46B, and allows angles of the rear leg portion 6, the front leg portion 5 integrally having the receiving member 7 and the bracket 8 to be adjusted respectively. Here, according to the present embodiment, the base body 3 is composed of the rear leg portion 6, the front leg portion 5 integrally having the receiving member 7 and the bracket 8.

Further, a front end of an auxiliary strip 51 is connected to the receiving member 7 by allowing a screw 53 to be screwed together with a female screw hole 53A of the bottom plate 21 of the receiving member 7.

In FIG. 8 and FIG. 9, there are shown mounting states involving fuel tanks 4 with different shapes, in which an angle between an upper surface 4J and a front surface 4M of such fuel tank 4 is modified. As shown in FIG. 8 and FIG. 9, mounting becomes possible even when the angle between the upper surface 4J and the front surface 4M varies.

In this sense, same functions and effects as those of the first embodiment can be achieved with the present embodiment.

Further, according to the present embodiment and with respect to a third aspect, the base body 3 comprises the front leg portion 5 to which the permanent magnet 2 serving as a mounting member is attached, and the rear leg portion 6. Since an angle between the front leg portion 5 and the rear leg portion 6 can be adjusted, the permanent magnets 2 are allowed to stick to the fuel tank 4 with respect to the angle between the upper surface 4J and the front surface 4M.

Furthermore, according to the present embodiment and with respect to a fourth aspect, the base body 3 comprises the bracket 8 serving as a holder for holding a navigation device 9 that is an accessory. Angles of the front leg portion 5, the rear leg portion 6 and the bracket 8 can be adjusted by means of the screws 46F, 46B serving common axes, thereby allowing the angle between the front leg portion 5 and the rear leg portion 6 to be adjusted. In this sense, the mounting device excels in versatility, and can be mounted on vehicle bodies with various shapes. In addition, a direction of the navigation device 9 can be adjusted by adjusting the angle of the bracket 8. Since common axis screws 46F, 46B are employed, the mounting device has a simple structure.

Furthermore, according to the present embodiment and with respect to a fifth aspect, there are provided on the front leg portion 5 and the rear leg portion 6 long holes 44, 45, 64, 65 through which screws 46F, 46B serving as axes are inserted, such front leg portion 5 and the rear leg portion 6 are any two of the front leg portion 5, the rear leg portion 6 and the bracket 8 serving as a holder. And, such screws 46F, 46B are further positionally fixed to the remaining bracket 8, thereby allowing the screws 46F, 46B to move along the long holes 44, 45, 64, 65, thus making it possible to adjust angles of the front leg portion 5, the rear leg portion 6 and the bracket 8.

As an effect of the present embodiment, the front leg portion 5 is integrally provided on the receiving member 7 to which the bracket 8 is attached, thus obtaining a simple structure. Further, since the permanent magnet 2 of the front leg portion 5 is attached to the front surface 4M of the fuel tank 4, an accessory can be attached to a front side of a vehicle.

(Third Embodiment)

Figure 10:
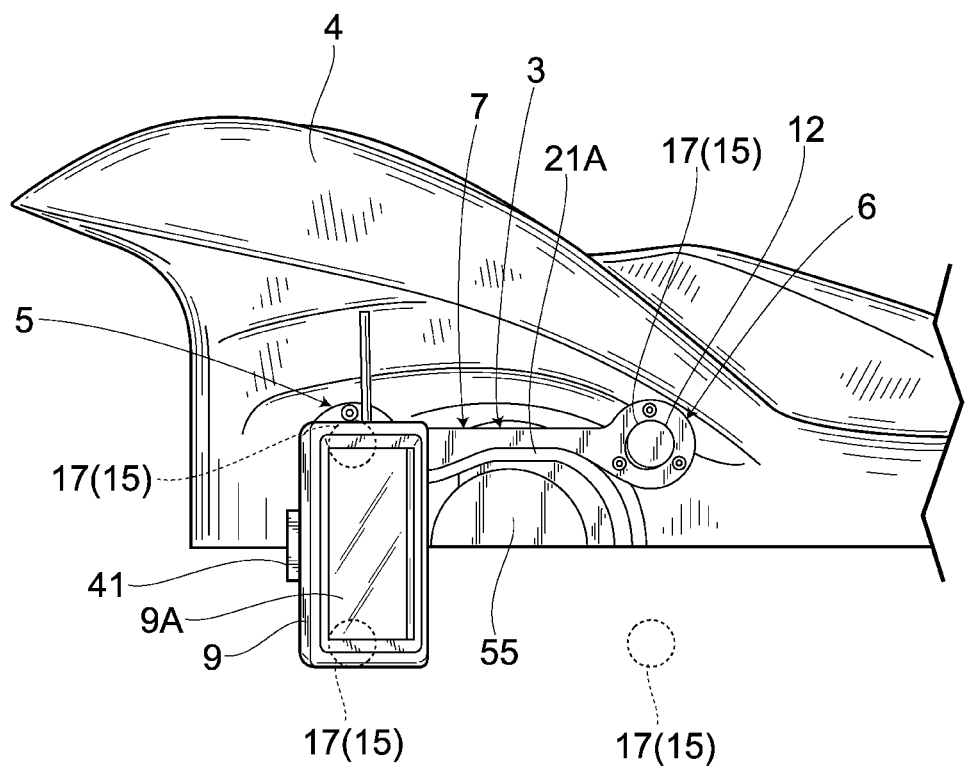
FIG. 10 is a plan view showing an essential section of a third embodiment of the present invention.

A third embodiment of the present invention is shown in FIG. 10. Same reference numbers are used to describe the same parts as those in the aforementioned embodiments, thereby omitting the detailed descriptions of such parts when describing the third embodiment. According to the present embodiment, a front leg portion 5 and a rear leg portion 6 are integrally provided on the receiving member 7 of the first embodiment. Specifically, through holes 12 are formed on both a left side and a right side of both a front side and a rear side of a bottom plate 21 of the receiving member 7, and permanent magnets 2 are attached to such through holes 12 by means of spherical joints 17. Further, a rear side of an opening 21A of the bottom plate 21 is in an opened condition, and the bottom plate 21 is formed into a substantial "U" shape when viewed from the top. The bottom plate 21 is so mounted on the fuel tank 4 that the opening 21A is adjusted to a filler cap 55, and a left and a right portions of the bottom plate 21 are caused to sandwich the filler cap 55 therebetween. In this way, the permanent magnets 2, 2, 2, 2, of the front leg portion 5 and the rear leg portion 6 are caused to stick to a front, a rear, a left and a right peripheries of the filler cap 55. In addition, the navigation device 9 is mounted on a front side so that an upper portion of the filler cap 55 is not blocked thereby. In this sense, a tank cap of the filler cap 55 can be opened with the mounting device 1 mounted, and fuel filling can thus be performed without interfering with the mounting device 1. Here, according to the present embodiment, a base body 3 is composed of the receiving member 7 integrally having the front leg portion 5 and the rear leg portion 6, and the bracket 8.

In this sense, same functions and effects as those of the aforementioned embodiments can be achieved with the present embodiment. Further, according to the present embodiment, the permanent magnets 2 are provided on both the left side and the right side of both the front side and the rear side of the bottom plate 21 of the base body 3, and the opening 21A corresponding to the filler cap 55 is provided on the bottom plate 21. Therefore, the permanent magnets 2 are allowed to stick to the front, the rear, the left and the right peripheries of the filler cap 55.

Here, the present invention is not limited to the aforementioned embodiments. As a matter of fact, various modified embodiments are possible within the scope of the present invention. For example, the saddle riding type vehicle can be a motorcycle, a snowmobile, a four-wheeled motorcycle or the like. Further, other than a navigation device, the accessory can be an electronic toll tag, a camera, a camcorder or the like. Furthermore, various kinds of members can be employed as the sticking members, including those exhibiting sticking effects due to negative pressure. Furthermore, instead of using screws, swaging tools and sticking members can also be used to mount the holder. Furthermore, if the vehicle body is made of a nonmagnetic material, magnetic members allowing magnets to be stuck thereto can be attached to the vehicle body when desiring to use magnets for mounting. Furthermore, when desiring to use planar fasteners as mounting members, one planer fastener can be provided on undersurfaces of the swing bodies, while there has to be provided on the vehicle body an other planar fastener that can be engaged with or disengaged from the one fastener. Furthermore, when desiring to use a bonding layer as a mounting member, the bonding layer can be provided on the undersurfaces of the swing bodies, such bonding layer being caused to stick to the vehicle body accordingly. Furthermore, the mounting device is preferably applied to a vehicle body other than the handlebar. Furthermore, the number of the mounting members can be one or more.

What is claimed:

1. An accessory mounting device for a saddle riding type vehicle, for mounting an electronic user-operated accessory on a vehicle body of a saddle riding type vehicle, comprising:

a base body on which said electronic user-operated can be mounted; and one or more mounting members for mounting said base body on said saddle riding type vehicle body, said one or more mounting members being provided on said base body via spherical joints, wherein said base body includes:

a holder provided with one or more first side plates provided with two first holes, said two first holes being composed of a first front hole formed on a front side of said first side plate and a first rear hole formed on a rear side of said first side plate; and a receiving member provided with one or more second side plates provided with two second holes, said two second holes being composed of a second front hole formed on a front side of said second side plate and a second rear hole formed on a rear side of said second side plate, said second front hole and said second rear hole corresponding to said first front hole and said first rear hole, respectively, either said first hole or said second hole is a long hole formed into a curved shape, a front moving member is inserted through said first front hole and said second front hole so that said front moving member moves back and forth along said long hole of said first front hole or said second front hole, a rear moving member is inserted through said first rear hole and said second rear hole so that said rear moving member moves back and forth along said long hole of said first rear hole or said second rear hole, said holder is supported by a two-axes sliding structure, and said two-axes sliding structure is configured to allow an angle of said holder to be adjusted by a back-and-forth motion of said front moving member and said rear moving member.

2. The accessory mounting device for a saddle riding type vehicle according to claim 1, wherein said one or more mounting members are configured to stick to said vehicle body.

3. The accessory mounting device for a saddle riding type vehicle according to claim 2, wherein said base body comprises a front leg portion and rear leg portion equipped with said one or more mounting members, respectively, and an angle between said front leg portion and said rear leg portion can be adjusted.

4. The accessory mounting device for a saddle riding type vehicle according to claim 3, wherein said rear leg portion is composed of a left leg portion main body and a right leg portion main body, third side plates of said left leg portion main body and said right leg portion main body are provided with two third holes, respectively, said two third holes being comprised of a third front hole formed on a front side of said third side plate and a third rear hole formed on a rear side of said third side plate, said third front hole and said third rear hole corresponding to said second front hole and said second rear hole, respectively, said front moving member being inserted through said first front hole, said second front hole and said third front hole, while said rear moving member being inserted through said first rear hole, said second rear hole and said third rear hole, whereby angles of said front leg portion, said rear leg portion and said holder can be adjusted by a back-and-forth motion of said front moving member and said rear moving member.

5. The accessory mounting device for saddle riding type vehicle according to claim 4, wherein any two of said first hole, said second hole and said third hole are long holes formed into a curved shape.

6. The accessory mounting device for a saddle riding type vehicle according to claim 2, wherein said base body is connected to said vehicle body via an auxiliary strip.

7. The accessory mounting device for a saddle riding type vehicle according to claim 3, wherein said base body is connected to said vehicle body via an auxiliary strip.

8. The accessory mounting device for a saddle riding type vehicle according to claim 4, wherein said base body is connected to said vehicle body via an auxiliary strip.

9. The accessory mounting device for a saddle riding type vehicle according to claim 5, wherein said base body is connected to said vehicle body via an auxiliary strip.

10. The accessory mounting device for a saddle riding type vehicle according to claim 1, wherein said base body comprises a front leg portion and rear leg portion equipped with said one or more mounting members, respectively, and an angle between said front leg portion and said rear leg portion can be adjusted.

11. The accessory mounting device for a saddle riding type vehicle according to claim 10, wherein said rear leg portion is composed of a left leg portion main body and a right leg portion main body, third side plates of said left leg portion main body and said right leg portion main body are provided with two third holes, respectively, said two third holes being composed of a third front hole formed on a front side of said third side plate and a third rear hole formed on a rear side of said third side plate, said third front hole and said third rear hole corresponding to said second front hole and said second rear hole, respectively, said front moving member being inserted through said first front hole, said second front hole and said third front hole, while said rear moving member being inserted through said first rear hole, said second rear hole and said third rear hole, whereby angles of said front leg portion, said rear leg portion and said holder can be adjusted by a back-and-forth motion of said front moving member and said rear moving member.

12. The accessory mounting device for saddle riding type vehicle according to claim 11, wherein any two of said first hole, said second hole and said third hole are long holes formed into a curved shape.

13. The accessory mounting device for a saddle riding type vehicle according to claim 10, wherein said base body is connected to said vehicle body via an auxiliary strip.

14. The accessory mounting device for a saddle riding type vehicle according to claim 11, wherein said base body is connected to said vehicle body via an auxiliary strip.

15. The accessory mounting device for a saddle riding type vehicle according to claim 12, wherein said base body is connected to said vehicle body via an auxiliary strip.

16. A method of using the accessory mounting device for a saddle riding type vehicle according to claim 1, comprising:

mounting said accessory mounting device upon a gas tank of the saddle riding type vehicle; and mounting an electronic user-operated accessory on said accessory mounting device with a display of said electronic user-operated accessory facing a user during operation of said saddle riding type vehicle.

17. The method according to claim 16, wherein said electronic user-operated accessory is a navigation device.

18. The method according to claim 16, wherein said one or more mounting members are configured to magnetically stick to said gas tank.

19. An assembly including the accessory mounting device for a saddle riding type vehicle according to claim 1, further comprising:
　said accessory mounting device mounted upon a gas tank of a saddle riding type vehicle; and
　an electronic user-operated accessory facing a user during operation of said saddle riding type vehicle.

20. The assembly according to claim 19, wherein said electronic user-operated accessory is a navigation device.

21. The assembly according to claim 19, wherein said one or more mounting members are configured to magnetically stick to said gas tank.

22. The accessory mounting device for a saddle riding type vehicle according to claim 1, wherein said base body is connected to said vehicle body via an auxiliary strip.

* * * * *